United States Patent
Jayaraman et al.

(10) Patent No.: US 10,929,017 B2
(45) Date of Patent: *Feb. 23, 2021

(54) DATA BLOCK MIGRATION

(71) Applicant: QUEST SOFTWARE INC., Aliso Viejo, CA (US)

(72) Inventors: Vinod Jayaraman, San Francisco, CA (US); Abhijit Dinkar, San Jose, CA (US); Mark Taylor, San Jose, CA (US); Goutham Rao, Santa Clara, CA (US); Michael E. Root, San Jose, CA (US); Murali Bashyam, Fremont, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,602

(22) Filed: Jun. 12, 2018

(65) Prior Publication Data
US 2018/0356983 A1 Dec. 13, 2018

Related U.S. Application Data

(63) Continuation of application No. 15/220,018, filed on Jul. 26, 2016, now Pat. No. 9,996,264, which is a continuation of application No. 13/158,289, filed on Jun. 10, 2011, now Pat. No. 9,400,799.

(60) Provisional application No. 61/389,602, filed on Oct. 4, 2010.

(51) Int. Cl.
G06F 12/00 (2006.01)
G06F 13/00 (2006.01)
G06F 3/06 (2006.01)
G06F 16/182 (2019.01)
G06F 16/174 (2019.01)

(52) U.S. Cl.
CPC ............ *G06F 3/0604* (2013.01); *G06F 3/067* (2013.01); *G06F 3/0608* (2013.01); *G06F 3/0641* (2013.01); *G06F 3/0643* (2013.01); *G06F 3/0647* (2013.01); *G06F 3/0667* (2013.01); *G06F 16/1748* (2019.01); *G06F 16/182* (2019.01)

(58) Field of Classification Search
CPC .... G06F 3/0604; G06F 3/0608; G06F 3/0641; G06F 3/0643; G06F 3/0647; G06F 3/0667; G06F 3/067; G06F 17/30156; G06F 17/30194
USPC ........................................................ 711/165
See application file for complete search history.

(56) References Cited

U.S. PATENT DOCUMENTS

| | | | | |
|---|---|---|---|---|
| 6,523,036 B1 * | 2/2003 | Hickman | .......... | G06F 17/30575 707/704 |
| 7,085,825 B1 * | 8/2006 | Pishevar | ............ | H04L 67/1095 709/204 |
| 7,260,716 B1 * | 8/2007 | Srivastava | ............ | H04L 9/0825 380/264 |
| 7,280,540 B2 * | 10/2007 | Halme | ................ | H04L 67/1002 370/392 |

(Continued)

Primary Examiner — Sheng Jen Tsai
(74) Attorney, Agent, or Firm — Maschoff Brennan

(57) ABSTRACT

Techniques and mechanisms are provided for migrating data blocks around a cluster during node addition and node deletion. Migration requires no downtime, as a newly added node is immediately operational while the data blocks are being moved. Blockmap files and deduplication dictionaries need not be updated.

18 Claims, 8 Drawing Sheets

(56) References Cited

U.S. PATENT DOCUMENTS

| | | | |
|---|---|---|---|
| 7,315,866 B2* | 1/2008 | Wu | G06F 21/64 |
| 7,478,243 B2* | 1/2009 | Bolosky | G06F 21/64 |
| | | | 713/181 |
| 7,647,329 B1* | 1/2010 | Fischman | G06F 17/30094 |
| | | | 707/999.1 |
| 7,685,109 B1* | 3/2010 | Ransil | G06F 17/30336 |
| | | | 707/999.003 |
| 7,721,044 B1* | 5/2010 | Chatterjee | G06F 3/0607 |
| | | | 707/610 |
| 7,814,149 B1* | 10/2010 | Stringham | G06F 17/30156 |
| | | | 707/758 |
| 7,930,559 B1* | 4/2011 | Beaverson | G06F 11/1453 |
| | | | 711/111 |
| 8,244,969 B2* | 8/2012 | McWilliams | G06F 12/0284 |
| | | | 711/103 |
| 9,400,799 B2* | 7/2016 | Jayaraman | G06F 17/30156 |
| 9,996,264 B2* | 6/2018 | Jayaraman | G06F 17/30156 |
| 2001/0042062 A1* | 11/2001 | Tenev | G06F 17/30958 |
| 2003/0004975 A1* | 1/2003 | Nakano | G06F 17/30595 |
| 2003/0185399 A1* | 10/2003 | Ishiguro | G11B 20/00086 |
| | | | 380/281 |
| 2003/0204509 A1* | 10/2003 | Dinker | G06F 17/30575 |
| 2003/0204786 A1* | 10/2003 | Dinker | H04L 41/12 |
| | | | 714/43 |
| 2004/0158625 A1* | 8/2004 | Neale | H04L 12/12 |
| | | | 709/223 |
| 2004/0162953 A1* | 8/2004 | Yoshida | G06F 3/0613 |
| | | | 711/153 |
| 2004/0190171 A1* | 9/2004 | Nakai | G08B 13/19669 |
| | | | 360/39 |
| 2005/0201299 A1* | 9/2005 | Radi | H04L 41/12 |
| | | | 370/254 |
| 2005/0237926 A1* | 10/2005 | Cheng | H04L 43/0817 |
| | | | 370/216 |
| 2005/0259572 A1* | 11/2005 | Esfahany | H04L 45/22 |
| | | | 370/217 |
| 2006/0155981 A1* | 7/2006 | Mizutani | H04L 9/0822 |
| | | | 713/150 |
| 2006/0218176 A1* | 9/2006 | Sun Hsu | G06F 17/30097 |
| 2008/0086620 A1* | 4/2008 | Morris | G06F 12/0284 |
| | | | 711/203 |
| 2008/0091609 A1* | 4/2008 | Nuttall | G06F 21/10 |
| | | | 705/51 |
| 2008/0120129 A1* | 5/2008 | Seubert | G06Q 10/06 |
| | | | 705/35 |
| 2008/0123664 A1* | 5/2008 | Schwan | G06F 17/3033 |
| | | | 370/395.32 |
| 2008/0228841 A1* | 9/2008 | Mizuno | G06F 11/2097 |
| 2008/0307171 A1* | 12/2008 | Kinoshita | G06F 3/0622 |
| | | | 711/154 |
| 2009/0037432 A1* | 2/2009 | Kamura | G06F 17/30194 |
| 2009/0144300 A1* | 6/2009 | Chatley | G06F 3/0613 |
| 2009/0240869 A1* | 9/2009 | O'Krafka | G06F 12/0284 |
| | | | 711/103 |
| 2010/0235606 A1* | 9/2010 | Oreland | G06F 17/3033 |
| | | | 711/173 |
| 2010/0306222 A1* | 12/2010 | Freedman | G06F 17/30961 |
| | | | 707/759 |
| 2011/0055621 A1* | 3/2011 | Mandagere | G06F 11/1435 |
| | | | 714/6.3 |
| 2011/0066591 A1* | 3/2011 | Moyne | G06F 17/30486 |
| | | | 707/610 |
| 2011/0082840 A1* | 4/2011 | Jayaraman | G06F 11/1453 |
| | | | 707/692 |
| 2011/0099351 A1* | 4/2011 | Condict | G06F 3/0608 |
| | | | 711/216 |
| 2011/0131390 A1* | 6/2011 | Srinivasan | G06F 3/0622 |
| | | | 711/209 |
| 2011/0191389 A1* | 8/2011 | Okamoto | G06F 17/30 |
| | | | 707/809 |
| 2011/0219133 A1* | 9/2011 | Shanmugham | H04L 65/1073 |
| | | | 709/229 |
| 2011/0231362 A1* | 9/2011 | Attarde | G06F 11/3442 |
| | | | 707/609 |
| 2011/0231375 A1* | 9/2011 | Cannon | G06F 17/30138 |
| | | | 707/692 |
| 2011/0267981 A1* | 11/2011 | Davies | H04L 45/02 |
| | | | 370/255 |
| 2011/0307659 A1* | 12/2011 | Hans | G06F 3/0613 |
| | | | 711/114 |
| 2011/0307736 A1* | 12/2011 | George | G06F 17/30519 |
| | | | 714/6.2 |
| 2012/0005424 A1* | 1/2012 | Shi | G06F 11/1076 |
| | | | 711/114 |
| 2012/0011171 A1* | 1/2012 | Tsuchimoto | G06F 17/30094 |
| | | | 707/812 |
| 2012/0036161 A1* | 2/2012 | Lacapra | G06F 17/30194 |
| | | | 707/781 |
| 2012/0036237 A1* | 2/2012 | Hasha | H04L 67/1095 |
| | | | 709/221 |
| 2012/0079195 A1* | 3/2012 | Bolen | H04L 67/1097 |
| | | | 711/114 |
| 2012/0084270 A1* | 4/2012 | Jayaraman | G06F 17/30156 |
| | | | 707/692 |
| 2012/0158800 A1* | 6/2012 | Peters | G06F 17/30536 |
| | | | 707/812 |
| 2012/0159102 A1* | 6/2012 | Kan | G06F 3/0613 |
| | | | 711/162 |
| 2012/0210047 A1* | 8/2012 | Peters | G06F 17/30536 |
| | | | 711/103 |
| 2012/0278287 A1* | 11/2012 | Wilk | G06F 11/1464 |
| | | | 707/654 |
| 2012/0303671 A1* | 11/2012 | Chowdhury | G06F 17/30923 |
| | | | 707/797 |
| 2012/0311339 A1* | 12/2012 | Irvine | H04L 63/0407 |
| | | | 713/176 |

* cited by examiner

Figure 4A

| Filemap File X 401 | | |
|---|---|---|
| Offset 403 | Index 405 | Lname 407 |
| 0K | 0.1 | NULL |
| 8K | 0.2 | NULL |
| 16K | 0.3 | NULL |

Figure 4B

| Datastore Suitcase 471 | | |
|---|---|---|
| | Data Table 451 | |
| Index 453 | Data Offset 455 | Data Reference Count 457 |
| 1 | Offset-Data A | 1 |
| 2 | Offset-Data B | 1 |
| 3 | Offset-Data C | 1 |
| | Datastore | |
| | Data 461 | Last File 463 |
| 1 | Data A | File X 401 |
| 2 | Data B | File X 401 |
| 3 | Data C | File X 401 |

Figure 5

| Dictionary 501 | |
|---|---|
| Hash 511 | Storage Location 521 |
| a | Location 523 |
| b | Location 525 |
| c | Location 527 |

| Dictionary 551 | |
|---|---|
| Hash 561 | Storage Location 571 |
| i | Location 573 |
| j | Location 575 |
| k | Location 577 |

DATA BLOCK MIGRATION

CROSS-REFERENCE TO RELATED APPLICATION

This application is a continuation of and claims benefit under 35 U.S.C. § 120 of U.S. application Ser. No. 15/220,018 filed Jul. 26, 2016, which is a continuation of 35 U.S.C. § 120 of U.S. application Ser. No. 13/158,289 filed Jun. 10, 2011, which claims benefit under 35 U.S.C. 119(e) of U.S. Provisional Application No. 61/389,602 filed Oct. 4, 2010. All applications are incorporated by reference in their entireties for all purposes.

TECHNICAL FIELD

The present disclosure relates to data block migration.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or a hash of the actual data. Once the segment ID is generated, it can be used to determine if the data segment already exists in the system. If the data segment does exist, it need not be stored again.

In many conventional implementations, data blocks may need to be migrated around a cluster. However, mechanisms for migrating data blocks are limited. Consequently, mechanisms are provided for improving data block migration.

BRIEF DESCRIPTION OF THE DRAWINGS

The disclosure may best be understood by reference to the following description taken in conjunction with the accompanying drawings, which illustrate particular embodiments of the present invention.

FIG. 4A illustrates a particular example of a filemap.

FIG. 4B illustrates a particular example of a datastore suitcase.

FIG. 5 illustrates a particular example of a deduplication dictionary.

DESCRIPTION OF PARTICULAR EMBODIMENTS

Figure 1:
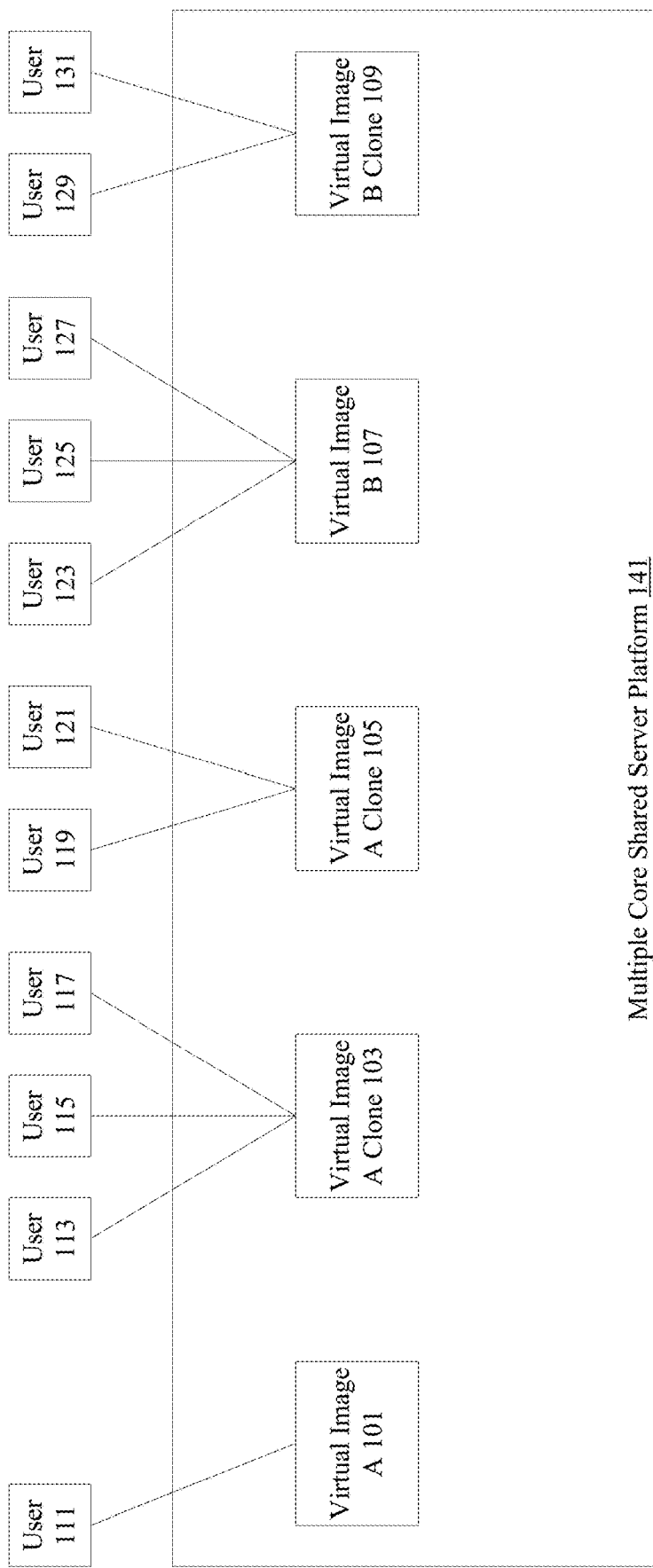
FIG. 1 illustrates a particular example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of data blocks. However, it should be noted that the techniques and mechanisms of the present invention apply to a variety of different data constructs including variations to data blocks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided for migrating data blocks around a cluster during node addition and node deletion. Migration requires no downtime, as a newly added node is immediately operational while the data blocks are being moved. Blockmap files and deduplication dictionaries need not be updated.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compression algorithms operate in a variety of manners, but many compression algorithms analyze data to determine source sequences in data that can be mapped to shorter code words. In many implementations, the most frequent source sequences or the most frequent long source sequences are replaced with the shortest possible code words.

Data deduplication reduces storage footprints by reducing the amount of redundant data. Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

In an active file system, nodes may need to be added or removed during system operation. It is often desirable to be able to migrate data blocks around the cluster in the face of node addition and node deletion. According to various embodiments, each block map and datastore suitcase in a cluster has a suitcase ID or SCID. An SCID identifies the node and the block map or datastore suitcase, so an SCID can globally identify a file located within the cluster.

According to various embodiments, the techniques and mechanisms of the present invention allow for mapping of nodes to an SCID in light of node addition and deletion. Node mappings can be changed while limiting or avoiding data copying. In particular embodiments, each SCID need not be scanned to update each blockmap to modify the SCID. The techniques of the present invention can be applied to any clustered environment with any number of nodes. Data can be rebalanced across the nodes whenever a new node is added. Similarly, data can be redistributed from a node when that node scheduled for removal while copying only data from the node to be removed Many existing mapping functions have a number of drawbacks. Many mapping functions can be difficult to calculate and may require numerous processor cycles. The mapping functions may require that keys be rewritten whenever a mapping function changes and may require extra copying of data between existing members when a new node is added. When adding a new node to a two node cluster, a less efficient solution may require copying data to the new node along with copying data from node 1 to node 2 and from node 2 to node 1. According to various embodiments of the present invention, data is only copied to the new node.

According to various embodiments, a node number can be obtained from a SCID using a function such as #define get_the_node_number_from_the_scid(_scid_)\scid_to_node_array[_scid_% MAX_CLUSTER_SIZE]. A mapping function allows a key to identify the node that holds the data. According to various embodiments, the mapping function can be changed while new keys are being generated. The keys themselves may contain a node number so that keys can be allocated independently on each node without communicating between the nodes. In particular embodiments, existing keys need not be rewritten to relocate data blocks to different nodes during a node addition or deletion. When a node is added, an arbitrary amount of data can be copied from each node to the new node to rebalance the data across the cluster.

FIG. 1 shows a multi-tenant on demand infrastructure. Multiple virtual machines including virtual machines correpsonding to virtual images 101, 103, 105, 107, and 109 are running on a multiple processor core shared server platform 141. According to various embodiments, virtual image A 101 is running a server operating system, a database server, as well as one or more custom applications. Virtual images 103 and 105 are clones of virtual image A 101. According to various embodiments, virtual image B 107 is running a server operating system, a database server, a web server, and/or one or more custom applications. Virtual image 109 is a clone of virtual image B 107. In particular embodiments, a user 111 is connected to a virtual image A 101. Users 113, 115, and 117 are connected to virtual image A clone 103. Users 119 and 121 are connected to virtual image A clone 105. Users 123, 125, and 127 are connected to virtual image B 107. Users 129 and 131 are connected to virtual image B clone 109.

A compute cloud service provider allows a user to create new instances of virtual images on demand. These new instances may be clones of exiting virtual machine images. An object optimization system provides application program interfaces (APIs) which can be used to instantly clone a file. When the API is used, a new stub is put in the user namespace and a block map file is cloned.

In particular embodiments, every file maintained in an object optimization system is represented by a block map file that represents all objects found in that file. The block map file includes the offsets and sizes of each object. Each entry in a block map file then points to a certain offset within a data suitcase. According to various embodiments, many block map files will be pointing to fewer data suitcases, hence resulting in multiple files sharing the same data blocks.

According to various embodiments, the block map file maintains all of the same offsets and location pointers as the original file's block map, so no user file data need be copied. In particular embodiments, if the cloned file is later modified, the behavior is the same as what happens when a deduplicated file is modified.

Figure 2:
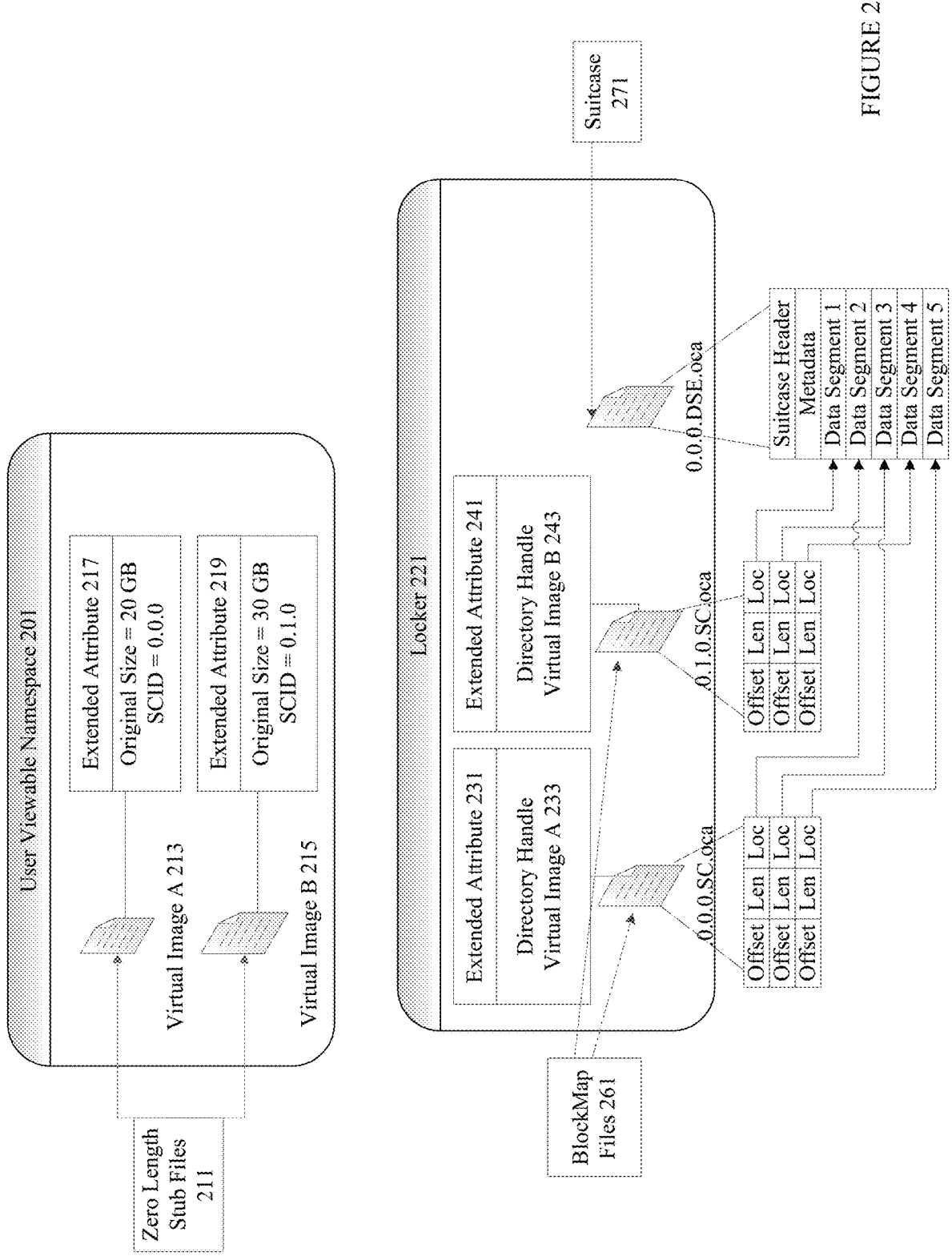
FIG. 2 illustrates one example of a locker.

FIG. 2 illustrates one example of an optimized file structure. According to various embodiments, an optimization system is told where it will store its data structures, where the data input stream is coming from, what the scope of optimization is, which optimization actions to apply to the stream, and how to mark data as having been optimized. Data is then optimized. In particular embodiments, optimized data is stored in a locker 221. The locker 221 can be a directory, a volume, a partition, or an interface to persistent object storage. Within that locker 221, optimized data is stored in containers or structures such as suitcase 271. In a file system, each suitcase 271 could be a file. In block or object storage, other formats may be used. A user viewable namespace 201 includes multiple stub files 211. According to various embodiments, stub files 211 correspond to virtual image A 213 and virtual image B 215. Virtual image A 213 is associated with extended attribute information 217 including file size data and/or other metadata. Virtual image B 215 is associated with extended attribute information 219 including file size data and/or other metadata.

According to various embodiments, optimized data is maintained in a locker 221. Block map files 261 include offset, length, and location identifiers for locating appropriate data segments in a datastore suitcase 271. Multiple block map files may point to the same data segments in a data store suitcase. Each blockmap file also has corresponding extended attribute information 231 and 241 corresponding to directory handle virtual image A 233 and directory handle virtual image B 243.

Figure 3A:
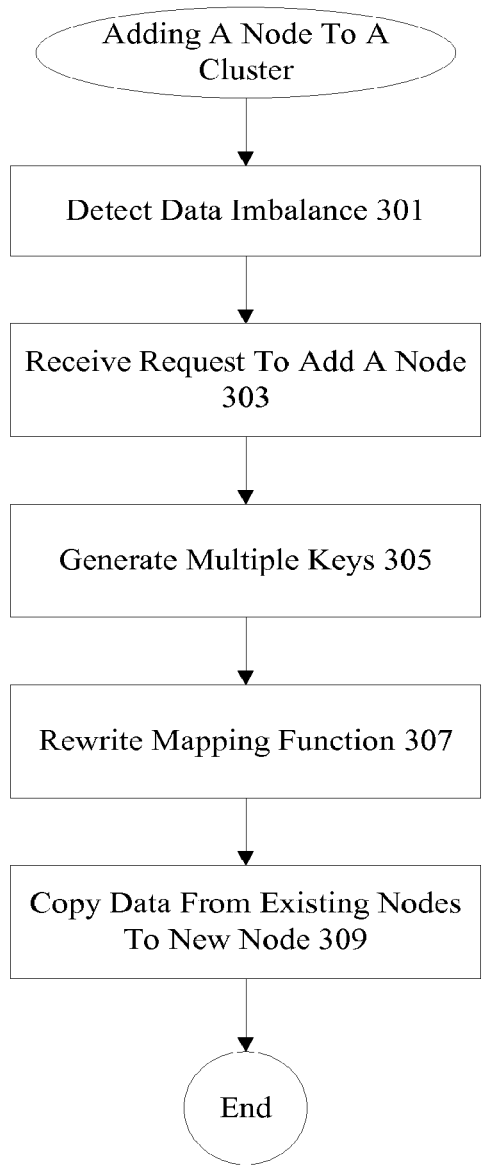
FIG. 3A illustrates one example of adding a node.

FIG. 3A illustrates one example of a technique for adding a node to a cluster. Although the technique will be described in the context of node addition, it should be recognized that various techniques can also apply to node removal or modification. At 301, a data imbalance is detected. According to various embodiments, a multicluster system may determine that particular nodes are heavily used while others remain sparsely used. In other examples, a system may detect that additional nodes are needed based on storage usage. In other examples, a node may be added or deleted even without any determination of data imbalance. At 303, a request to add a node is received. Adding a node may correspond to bringing additional storage arrays or storage devices online in a storage cluster.

At 305, multiple keys are generated. In particular embodiments, a mapping function is rewritten at 307. In particular embodiments, the multiple keys may be suitcase identifiers and/or correspond to particular blockmap files. According to various embodiments, the mapping function provides that the keys identify or correspond to particular nodes. The mapping function may be rewritten while generating the multiple keys. At 309, data is copied from nodes to a new node to rebalance data across the data storage cluster. According to various embodiments, blockmap files need not be scanned, accessed, analyzed, or modified during node addition, removal, or modification. In particular embodiments, blockmap files remain unchanged.

Figure 3B:
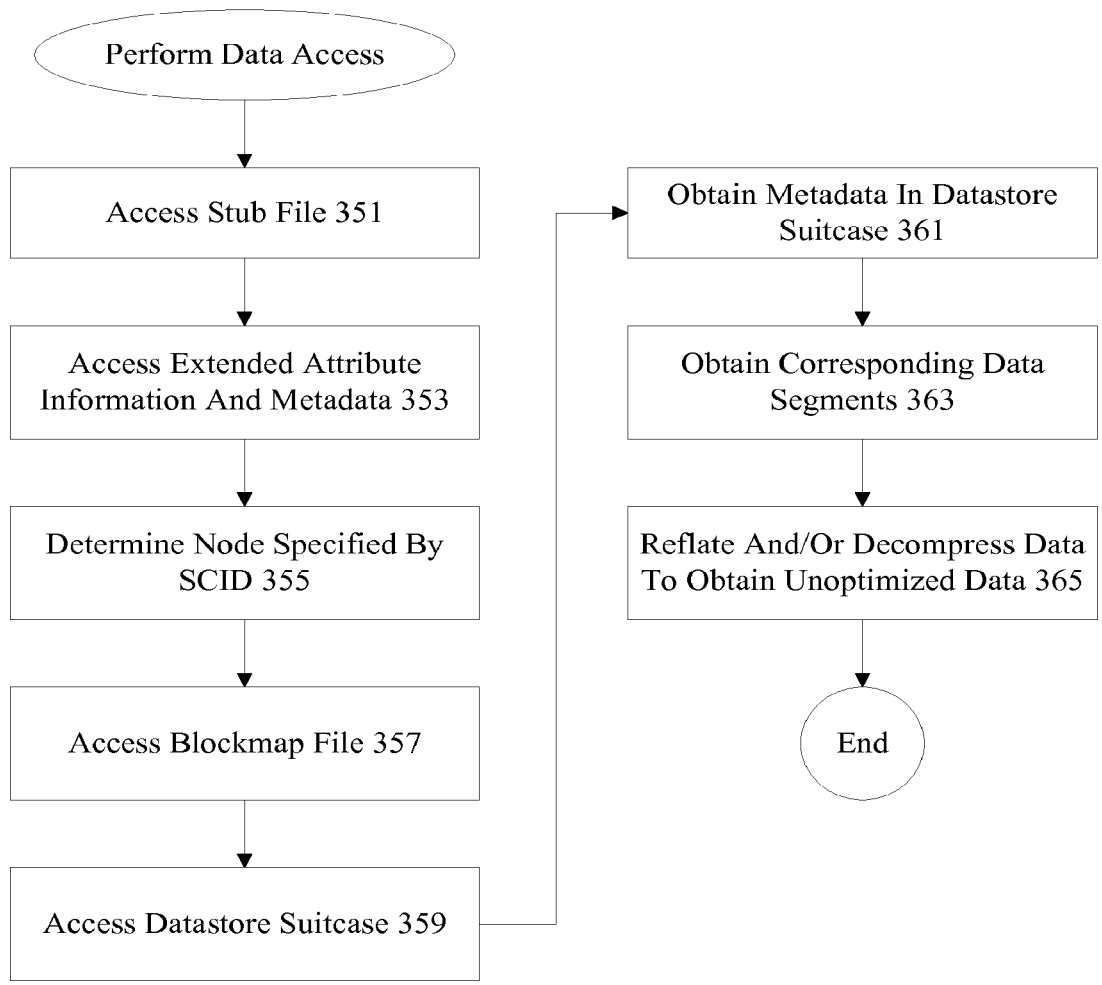
FIG. 3B illsutrates one example of performing data access.

FIG. 3B illustrates one example of a technique for performing data access after data migration. At 351, a stub file is accessed. The stub file corresponds to a virtual image of an optimized file and includes extended attribute information such as metadata. According to various embodiments, the stub file provides a suitcase identifier (SCID). In particular embodiments, the suitcase identifier specifies a node. In particular embodiments, extended attribute information and metadata can be accessed immediately in a user space at 353. At 355, the node specified by the SCID is determined. According to various embodiments, a node specified by the SCID is determined. In particular embodiments, the node number is identified by accessing an index using the modulo of the SCID and the max cluster size. In some examples, the node number is obtained from an SCID using a function such as the following:

define get_the_node_number_from_the_scid(_scid_) scid_to_node_array[_scid_% MAX_CLUSTER_SIZE]

At 357, the user accesses the blockmap file. The blockmap file includes offset, length, and location information identifying data segments in a data store suitcase. According to various embodiments, the blockmap file need not be accessed, scanned, or updated upon data migration. At 359, the data store suitcase in the appropriate node is accessed. At 361, metadata in the datastore suitcase may be obtained. At 363, data segments in the datastore suitcase may be obtained. The data segments may be reflated and/or decompressed at 365 to obtained unoptimized data.

FIG. 4A illustrates one example of a block map file or filemap and FIG. 4B illustrates a corresponding datastore suitcase created after optimizing a file X. Filemap file X 401 includes offset 403, index 405, and lname 407 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 407 is NULL in the filemap because each segment has not previously been referenced by any file.

FIG. 4B illustrates one example of a datastore suitcase corresponding to the filemap file X 401. According to various embodiments, datastore suitcase 471 includes an index portion and a data portion. The index section includes indices 453, data offsets 455, and data reference counts 457. The data section includes indices 453, data 461, and last file references 463. According to various embodiments, arranging a data table 451 in this manner allows a system to perform a bulk read of the index portion to obtain offset data to allow parallel reads of large amounts of data in the data section.

According to various embodiments, datastore suitcase 471 includes three offset, reference count pairs which map to the data segments of the filemap file X 401. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 401 which was last to place a reference on the data A. Index 2 includes data B and a reference to File X 401 which was last to place a reference on the data B. Index 3 includes data C and a reference to File X 401 which was last to place a reference on the data C.

According to various embodiments, the dictionary is a key for the deduplication system. The dictionary is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on segment ID or hash value ranges for various data segments. Ranges of hash values are assigned to different nodes within the cluster. If a node is processing a data segment which has a hash value which maps to another node, it will contact the other node that owns the range to find out if the data segments already exist in a datastore.

FIG. 5 illustrates multiple dictionaries assigned to different segment ID or hash ranges. Although hash ranges are described, it should be recognized that the dictionary index can be hash ranges, reference values, or other types of keys. According to various embodiments, the hash values are SHA1 hash values. In particular embodiments, dictionary 501 is used by a first node and includes hash ranges from 0x0000 0000 0000 0000-0x0000 0000 FFFF FFFF. Dictionary 551 is used by a second node and includes hash ranges from 0x0000 0001 0000 0000-0X0000 0001 FFFF FFFF. Hash values 511 within the range for dictionary 501 are represented by symbols a, b, and c for simplicity. Hash values 561 within the range for dictionary 551 are represented by symbols i, j, and k for simplicity. According to various embodiments, each hash value in dictionary 501 is mapped to a particular storage location 521 such as location 523, 525, or 527. Each hash value in dictionary 551 is mapped to a particular storage location 571 such as location 573, 575, and 577.

Having numerous small segments increases the likelihood that duplicates will be found. However, having numerous small segments decreases the efficiency of using the dictionary itself as well as the efficiency of using associated filemaps and datastore suitcases.

Figure 6A:
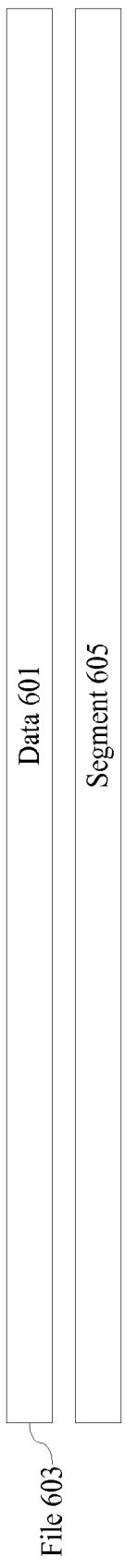
FIG. 6A illustrates a particular example of a file having a single data segment.

FIG. 6A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 601 includes file 603 of a type that does not benefit from finer grain segmentation. File types that do not benefit from finer grain segmentation include image files such as .jpg, .png, .gif, .and .bmp files. Consequently, file 603 is provided with a single segment 605. A single segment is maintained in the deduplication dictionary. Providing a single large segment encompassing an entire file can also make compression of the segment more efficient. According to various embodiments, multiple segments encompassing multiple files of the same type are compressed at the same time. In particular embodiments, only segments having data from the same type of file are compressed using a single compression context. It is recognized that specialized compressors may be applied to particular segments associated with the same file type.

Figure 6B:
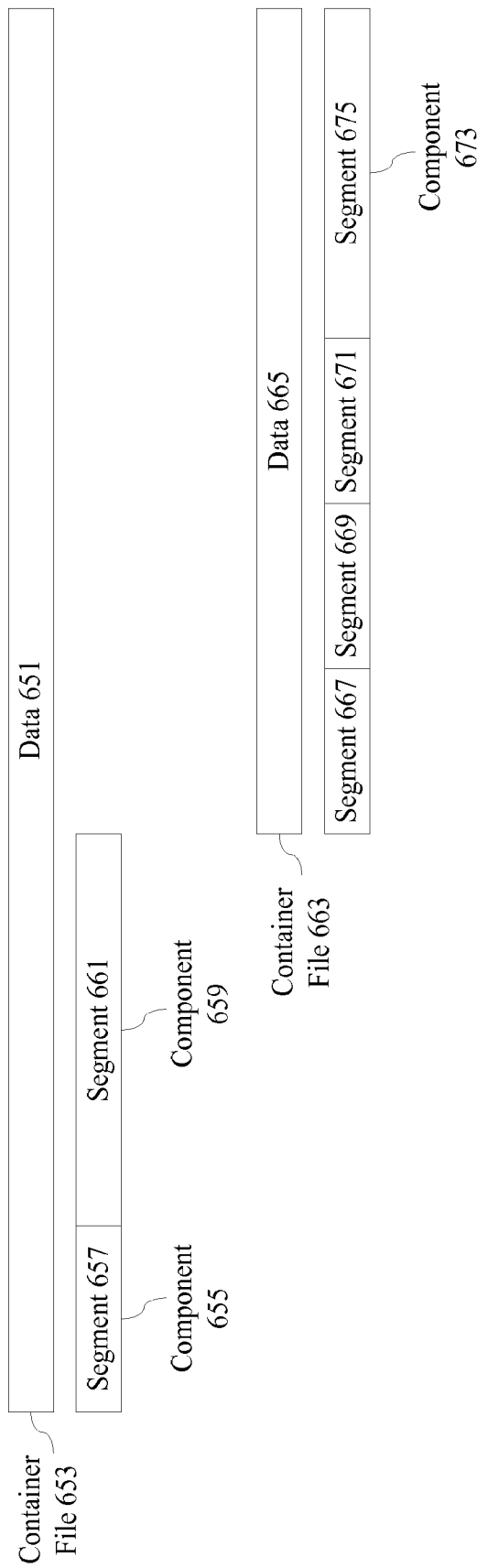
FIG. 6B illustrates a particular example of a file having multiple data segments and components.

FIG. 6B illustrates one example of a container file having multiple disparate objects. Data 651 includes a container file that does benefit from more intelligent segmentation. According to various embodiments, segmentation can be performed intelligently while allowing compression of multiple segments using a single compression context. Segmentation can be implemented in an intelligent manner for deduplication while improving compression efficiency. Instead of selecting a single segment size or using a sliding segment window, file 653 is delayered to extract file components. For example, a .docx file may include text, images, as well as other container files. For example, file 653 may include components 655, 659, and 663. Component 655 may be a component that does not benefit from finer grain segmentation and consequently includes only segment 657. Similarly, component 659 also includes a single segment 661. By contrast, component 663 is actually an embedded container file 663 that includes not only data that does benefit from additional segmentation but also includes another component 673. For example, data 665 may include text. According to various embodiments, the segment size for text may be a predetermined size or a dynamic or tunable size. In particular embodiments, text is separated into equal sized segments 667, 669, and 671. Consequently, data may also include a non-text object 673 that is provided with segment boundaries aligned with the object boundaries 675.

Figure 7:
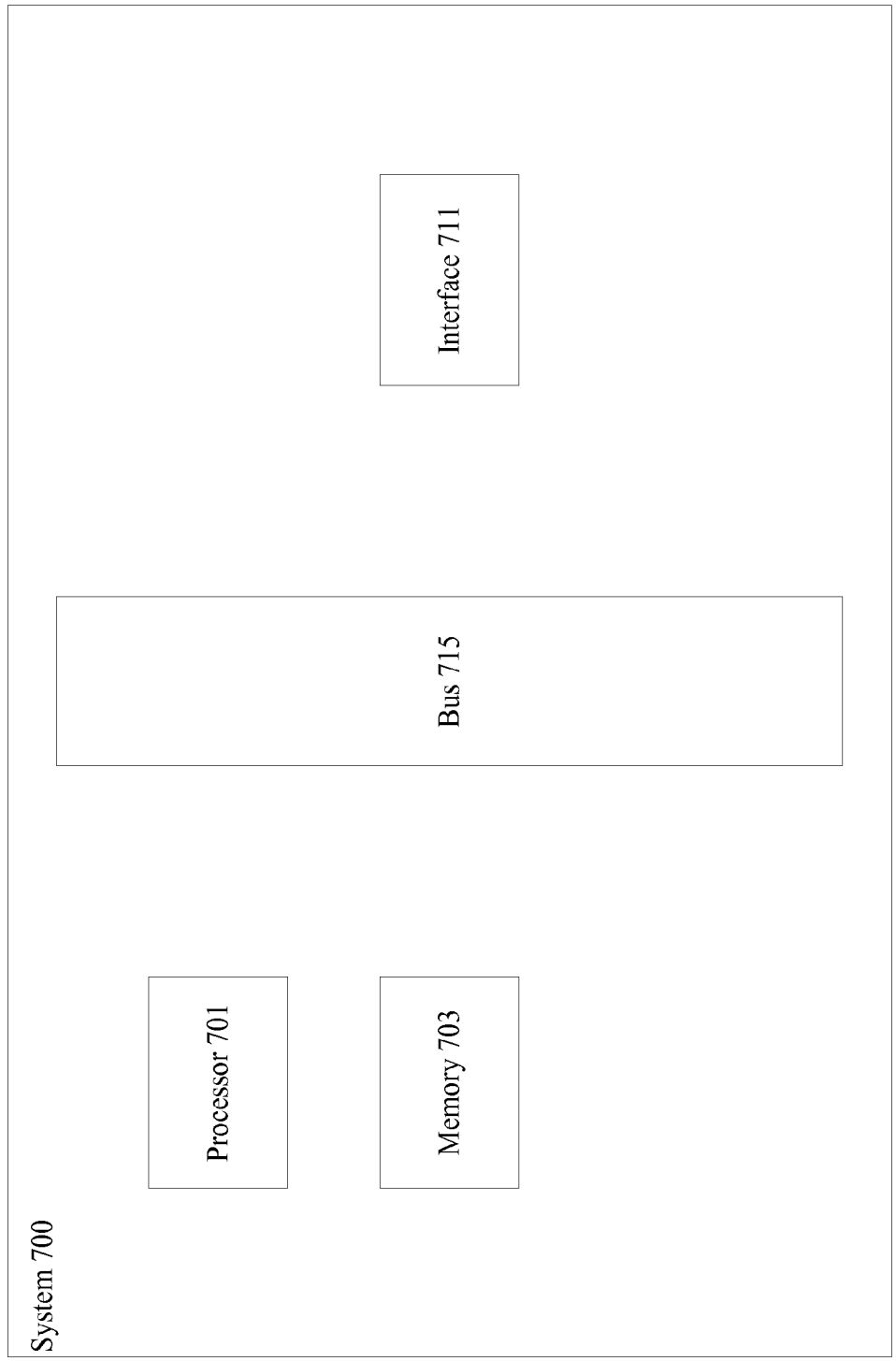
FIG. 7 illustrates a particular example of a computer system.

A variety of devices and applications can implement particular examples of network efficient deduplication. FIG. 7 illustrates one example of a computer system. According to particular example embodiments, a system 700 suitable for implementing particular embodiments of the present invention includes a processor 701, a memory 703, an interface 711, and a bus 715 (e.g., a PCI bus). When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
receiving a request to add a new node to a data storage cluster, the data storage cluster maintaining a plurality of deduplicated data segments at particular nodes in the data storage cluster, wherein the particular nodes include datastore suitcases created after optimizing a file, each datastore suitcase corresponding to a filemap file, each datastore suitcase comprising an index portion and a data portion, the index portion including a first set of indices, offset information, and a data reference count, the data portion including a second set of indices, a data structure including deduplicated data segments, and last file reference information, the deduplicated data segments including a first deduplicated data segment, the last file reference information indicating a particular file that was the last file to place a reference on the first deduplicated data segment;
generating one or more keys associated with a mapping function, the mapping function using a particular key to identify a particular node containing a particular deduplicated data segment, wherein the one or more keys are used to identify particular deduplicated data segments stored in particular nodes, including the new node, of the data storage cluster;
copying data including deduplicated data segments from the plurality of existing nodes to the new node, in accordance with the mapping function and one or more new keys,
wherein a performance of data access after data migration includes accessing a file corresponding to a virtual image of the optimized file, the file providing an identifier that specifies a node.

2. The method of claim 1, wherein one or more keys each include a node number.

3. The method of claim 1, wherein the one or more keys correspond to one or more blockmap files, wherein the blockmap files do not contain references to the one or more keys.

4. The method of claim 3, wherein each blockmap file includes offset, length, and location identifiers for identifying segments in a plurality of suitcases.

5. The method of claim 3, wherein the one or more blockmap files remain unchanged after adding the new node.

6. The method of claim 1, wherein the one or more new keys include one or more suitcase identifiers.

7. The method of claim 6, performing data access includes decompressing the optimized file.

8. A system, comprising:
a processor; and
memory comprising instructions to execute operations, the operations comprising:
receiving a request to add a new node to a data storage cluster;
generating one or more keys associated with a mapping function, the mapping function using a particular key to identify a particular node containing a particular item, the particular node including a first deduplicated data segment and last file reference information indicating a particular file that was the last file to place a reference on the first deduplicated data segment; and
copying data including the first deduplicated data segment from an existing node to the new node, in accordance with the mapping function and the one or more keys, wherein performing data access after data migration includes accessing a file to identify an identifier that specifies a node, wherein the plurality of new keys correspond to a plurality of blockmap files, wherein the blockmap files do not contain references to the new keys.

9. The system of claim 8, wherein each key of the one or more keys includes a node number.

10. The system of claim 8, wherein the data storage cluster is configured to maintain a plurality of deduplicated data segments in a plurality of suitcases at particular nodes in the data storage cluster, wherein the plurality of suitcases include datastore suitcases created after optimizing a file, wherein optimizing the file includes compressing the file.

11. The system of claim 10, wherein each datastore suitcase includes a data structure including deduplicated data segments, index information, offset information, data reference count information, and last file reference information.

12. The system of claim 8, wherein each blockmap file includes offset, length, and location identifiers for identifying segments in a plurality of suitcases.

13. The system of claim 8, wherein the plurality of blockmap files remain unchanged after adding the new node.

14. The system of claim 8, wherein the one or more new keys include one or more suitcase identifiers.

15. A non-transitory computer readable medium comprising computer code for:
receiving a request to add a new node to a data storage cluster;
generating one or more keys associated with a mapping function, the mapping function using a particular key to identify a particular node containing a particular item, the particular node including a first deduplicated data segment and last file reference information indicating a particular file that was the last file to place a reference on the first deduplicated data segment; and
copying data including the first deduplicated data segment from an existing node to the new node, in accordance with the mapping function and the one or more keys, wherein performing data access after data migration includes accessing a file to identify an identifier that specifies a node, wherein the plurality of new keys correspond to a plurality of blockmap files, wherein the blockmap files do not contain references to the new keys.

16. The non-transitory computer readable medium of claim 15, wherein the data storage cluster is configured to maintain a plurality of deduplicated data segments in a plurality of suitcases at particular nodes in the data storage cluster, wherein the plurality of suitcases include datastore suitcases created after optimizing a file, wherein optimizing the file includes compressing the file.

17. The non-transitory computer readable medium of claim 16, wherein each datastore suitcase includes a data structure including deduplicated data segments, index information, offset information, data reference count information, and last file reference information.

18. The non-transitory computer readable medium of claim 15, wherein each blockmap file includes offset, length, and location identifiers for identifying segments in a plurality of suitcases.

* * * * *